United States Patent
Kuo et al.

(10) Patent No.: US 7,617,266 B2
(45) Date of Patent: Nov. 10, 2009

(54) NONLINEAR CONVERSION SYSTEM USING PRECISION MAPPING AND THE METHOD THEREOF

(75) Inventors: Kao-Yueh Kuo, Hsinchu (TW); Yu-Shu Chiu, Taoyuan (TW); Hui-Ming Wang, Taipei (TW); Jung-Yu Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 928 days.

(21) Appl. No.: 11/207,783

(22) Filed: Aug. 22, 2005

(65) Prior Publication Data
US 2006/0277237 A1  Dec. 7, 2006

(30) Foreign Application Priority Data
Jun. 3, 2005  (TW) .............................. 94118497 A

(51) Int. Cl.
*G06F 1/02* (2006.01)
(52) U.S. Cl. ...................... 708/272; 708/605
(58) Field of Classification Search ......... 708/605–606, 708/500, 277
See application file for complete search history.

(56) References Cited

U.S. PATENT DOCUMENTS

| | | | |
|---|---|---|---|
| 4,905,177 A * | 2/1990 | Weaver et al. .............. | 708/276 |
| 5,951,629 A | 9/1999 | Wertheim et al. | |
| 6,065,031 A | 5/2000 | Pan et al. | |
| 6,389,443 B1 | 5/2002 | Philipsson | |
| 7,117,238 B1 * | 10/2006 | Foskett et al. .............. | 708/502 |

* cited by examiner

*Primary Examiner*—Tan V Mai
(74) *Attorney, Agent, or Firm*—Harness, Dickey & Pierce, P.L.C.

(57) ABSTRACT

A nonlinear conversion system using precision mapping and the method thereof are described. The system includes a source value converter, a mapping table unit, a recovering parameter computing unit, and an output computing unit. The method includes the steps of: receiving an input value; converting the input value into a source value; mapping the source value to a destination value in a limited domain for restricting the calculation within a destination domain; establishing a mapping table by directly selecting a precision according to the destination domain and inverse-mapping back to a source domain; and outputting the destination value according to the mapping table, combining the destination value with a recovering parameter for recovering an output value produced by the nonlinear conversion of the input value.

15 Claims, 16 Drawing Sheets

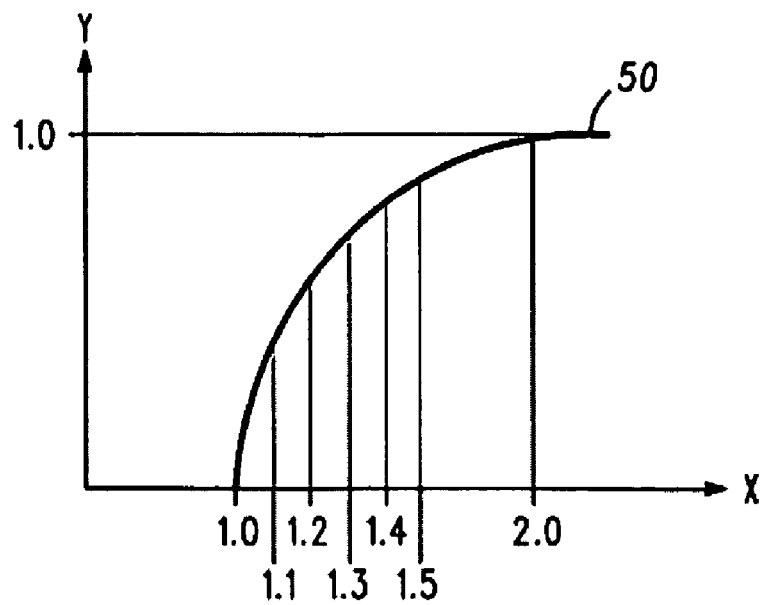
FIG.1(Priort Art)
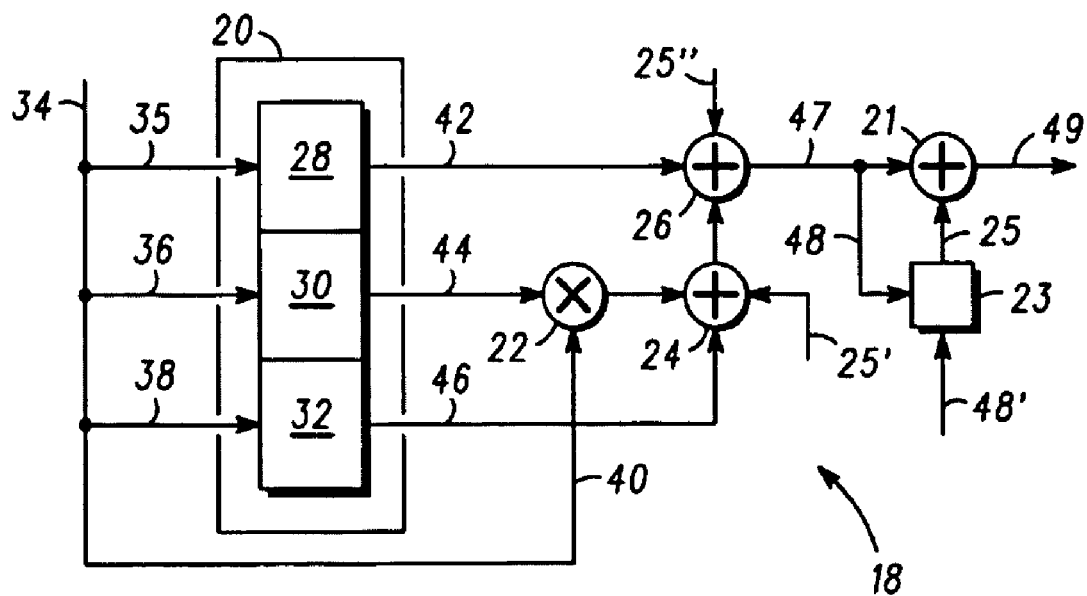
FIG.1A(Priort Art)

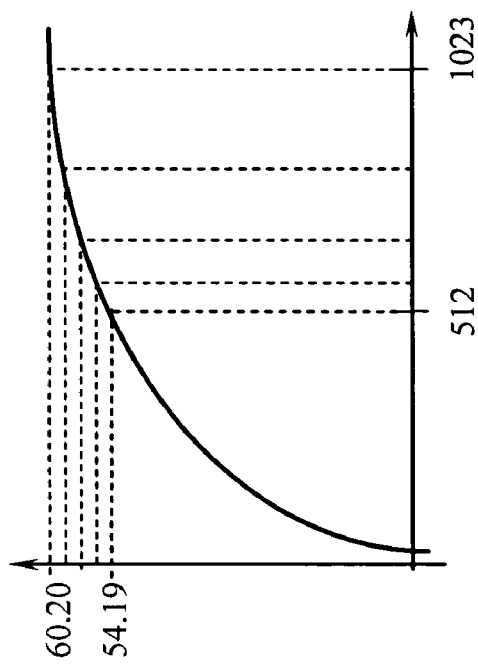
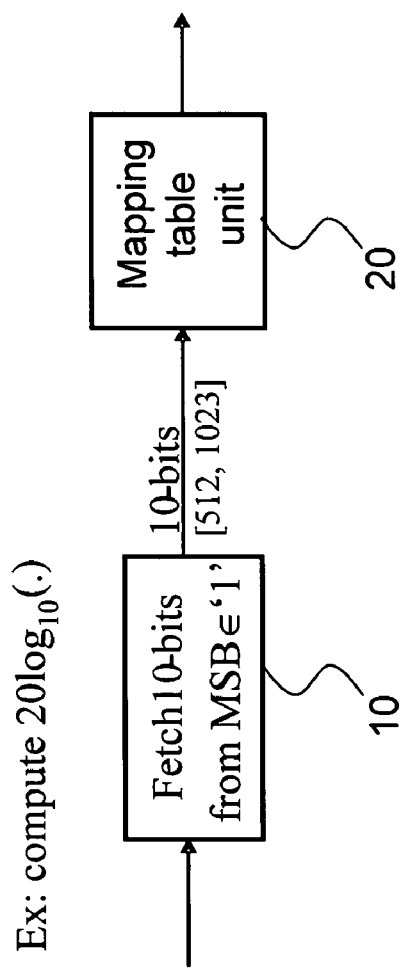
FIG.5A
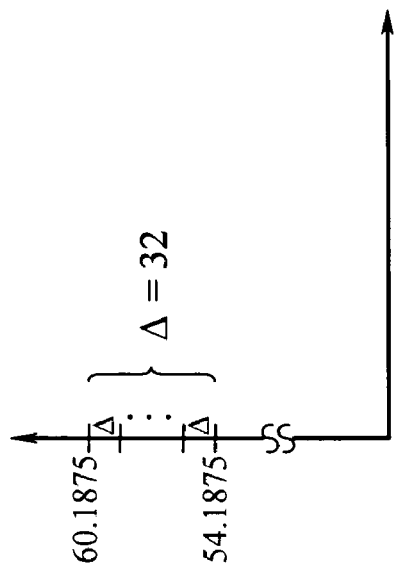
FIG.5B

| m | | Residue | |
|---|---|---|---|
| 0.03125 * ( 0 ~ 3 ) | | 0.0 | |
| 0.03125 * ( 4 ~ 9 ) | | 0.09375 * 1 | |
| 0.03125 * ( 10 ~ 15 ) | | 0.09375 * 2 | |
| 0.03125 * ( 16 ~ 21 ) | | 0.09375 * 3 | |
| 0.03125 * ( 22 ~ 28 ) | | 0.09375 * 4 | |
| 0.03125 * ( 29 ~ 35 ) | | 0.09375 * 5 | |
| 0.03125 * ( 36 ~ 42 ) | | 0.09375 * 6 | |
| 0.03125 * ( 43 ~ 49 ) | | 0.09375 * 7 | |
| 0.03125 * ( 50 ~ 56 ) | | 0.09375 * 8 | |
| 0.03125 * ( 57 ~ 64 ) | | 0.09375 * 9 | |
| 0.03125 * ( 65 ~ 72 ) | | 0.09375 * 10 | |
| 0.03125 * ( 73 ~ 80 ) | | 0.09375 * 11 | |
| 0.03125 * ( 81 ~ 89 ) | ⇒ | 0.09375 * 12 | |
| 0.03125 * ( 90 ~ 97 ) | | 0.09375 * 13 | |
| 0.03125 * ( 98 ~ 107 ) | | 0.09375 * 14 | |
| 0.03125 * ( 108 ~ 116 ) | | 0.09375 * 15 | |
| 0.03125 * ( 117 ~ 127 ) | | 0.09375 * 16 | |
| 0.03125 * ( 128 ~ 137 ) | | 0.09375 * 17 | |
| 0.03125 * ( 138 ~ 149 ) | | 0.09375 * 18 | |
| 0.03125 * ( 150 ~ 161 ) | | 0.09375 * 19 | |
| 0.03125 * ( 162 ~ 174 ) | | 0.09375 * 20 | |
| 0.03125 * ( 175 ~ 188 ) | | 0.09375 * 21 | |
| 0.03125 * ( 189 ~ 203 ) | | 0.09375 * 22 | |
| 0.03125 * ( 204 ~ 220 ) | | 0.09375 * 23 | |
| 0.03125 * ( 221 ~ 239 ) | | 0.09375 * 24 | |
| 0.03125 * ( 240 ~ 260 ) | | 0.09375 * 25 | |
| 0.03125 * ( 261 ~ 284 ) | | 0.09375 * 26 | |
| 0.03125 * ( 285 ~ 313 ) | | 0.09375 * 27 | |
| 0.03125 * ( 314 ~ 349 ) | | 0.09375 * 28 | |
| 0.03125 * ( 350 ~ 395 ) | | 0.09375 * 29 | |
| 0.03125 * ( 396 ~ 464 ) | | 0.09375 * 30 | |
| 0.03125 * ( 465 ~ 600 ) | | 0.09375 * 31 | |
| 0.03125 * ( 601 ~ INF ) | >18.75 | 0.09375 * 32 | = 3.0 |

FIG.6B

NONLINEAR CONVERSION SYSTEM USING PRECISION MAPPING AND THE METHOD THEREOF

BACKGROUND OF THE INVENTION

1. Field of Invention

The invention relates to a nonlinear conversion system and the method thereof. In particular, it relates to a nonlinear conversion system with precision mapping and the method thereof.

2. Related Art

Nonlinear conversions, such as the log convert, log add, square root, cosine function, and so on, have very wide applications. However, different systems may not be provided with the required nonlinear conversion operations. Therefore, some additional techniques along with the basic addition and multiplication operations are needed to achieve the goal.

The most common method to approximate the log convert is to restrict the search range in the domain [1~2]. For example, if one wants to compute $$Y = \log_{10} X,$$

then X is first converted:

$$X = 0.1 x_1 x_2 \ldots x_n * 2^{-k} = 1.x_1 x_2 \ldots x_n * 2^{-(k+1)}$$

and its log in the base of 2 is evaluated:

$$\log_2(X) = \log_2(1+x) - (k+1)$$

where $(1+x) \in [1\sim2]$. Therefore, the logarithmic operation becomes a log in the domain of $[1\sim2)$ in the base of 2. Therefore, one first calculates $$y = \log_2(1+x),$$

and converts it back to a log in the base of 10

$$Y = [y - (k+1)] \cdot \log_{10} 2.$$

This then gives the original value.

From the above derivation, one knows that the log function of any number X can be converted and mapped to a smaller domain. One first obtains the log function in the domain [1~2] in the base of 2 (i.e. calculating y). The original log function is then computed by multiplying it with an appropriate coefficient. The search domain after such a conversion is restricted to [1~2]. Likewise, one only needs to search between $\log_2 1 \sim \log_2 2$ when doing approximations. The domain and complexity are thus greatly reduced. For example, in U.S. Pat. No. 5,951,629 proposed by Motorola, the domain [1~2] is divided into several sections, as shown in FIG. 1. Different sections of the curve are approximated by polynomials $$y = b_0 + b_1(1+x) + b_2(1+x)^2.$$

To simplify the computational structure, the 2nd-order term is used as a compensation done by first estimating its approximate value for different inputs of x. Therefore, the actual formula should be $$y = b_0 + b_1(1+x) + f_2(x).$$

The simplified calculation structure is shown in FIG. 1A.

Moreover, since multiplication involves more complexity, we sacrifice some precision to simplify the operation. Suppose each section of the curve can be approximated by a straight line:

$$g = m_i x + b_i$$

If the approximate slope of some section is expressed in the base of 2 as $m_i = 1.001011 \ldots_2$, then $m_i x$ is expressed as:

$$m_i \times x = x + \frac{x}{8} + \frac{x}{32} + \frac{x}{64}$$

If the approximate slope of another section is $m_j = 0.1101001 \ldots_2$, then $m_j x$ is expressed as:

$$m_j \times x = \frac{x}{2} + \frac{x}{4} + \frac{x}{16} + \frac{x}{128}$$

Using the above-mentioned method, the approximate parameter $m_i$ of each section of the curve uses the first few effective 1 in the base of 2 (the first four 1 in this example) to simplify the multiplication operation of the first-order term. With the help of the pre-calculated $b_i$, one is then able to obtain the approximate value. However, this method neglects the $2^{nd}$-order approximation to simplify the overall computation. The computation of the first-order term is achieved at the price of sacrificing some precision. Therefore, its ultimate precision of the approximation will be lower than using a complete multiplier.

To reduce the overall computation complexity, Motorola proposed another idea disclosed in U.S. Pat. No. 6,065,031. For the logrithmic operation in a limited input domain, the approximation for regions closer to straight lines is achieved by subtracting some offset, which we will not describe in further detail herein.

For the operation of square root, Ericsson employs the Newton-Raphson method in U.S. Pat. No. 6,389,443. However, this method has to compute continuously N times. Therefore, it is simplified to start from the point whose square root is $2^N$. Although the computing process is simplified, the precision is greatly sacrificed.

Therefore, for different nonlinear conversion systems whethere there is a universal mechanism that uses a simple structure and computational method to achieve the required precision is thus an important issue.

SUMMARY OF THE INVENTION

In view of the foregoing, the invention provides a nonlinear conversion system using precision mapping and the method thereof. It establishes the required operation mechanism and structure according to the demanded precision. It has the flexibility of being applied to different nonlinear conversions.

On the other hand, the operation mechanism and structure of the invention is expected to be most easily implemented by hardware. The mapping table avoids the use of multipliers. The table is implemented using the design of fixed points. In comparison with the conventional mapping table that uses a lot of memory, the precision mapping of the invention uses an accumulator to greatly reduce the use of memory. The conversion precision is increased using mid-point mapping.

The disclosed nonlinear conversion system using precision mapping includes a source value converter, which receives an input value, converts it into a source value, and maps the source value to a destination value in a limited domain in order to restrict the calculation within a destination domain; a mapping table unit, which is established by directly selecting a precision according to the destination domain and inverse-mapping back to a source domain; a recovering parameter computing unit, which operates information that has to be preserved during the process of converting to the source value to obtain a recovering parameter; and an output computing unit, which combines the recovering parameter according to the destination value output by the mapping table to recover an output value produced by the nonlinear conversion of the input value.

The disclosed nonlinear conversion method using precision mapping includes the steps of: receiving an input value; converting the input value into a source value; mapping the source value to a destination value in a limited domain for restricting the calculation within a destination domain; establishing a mapping table by directly selecting a precision according to the destination domain and inverse-mapping back to a source domain; and outputting the destination value according to the mapping table, combining the destination value with a recovering parameter for recovering an output value produced by the nonlinear conversion of the input value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIGS. 1 and 1A show the block diagrams of a conventional system;

FIGS. 5A to 5G are schematic views of establishing the disclosed mapping table unit;

FIGS. 6A and 6B are schematic views of the mapping table unit according to FIG. 6;

DETAILED DESCRIPTION OF THE INVENTION

Figure 2:
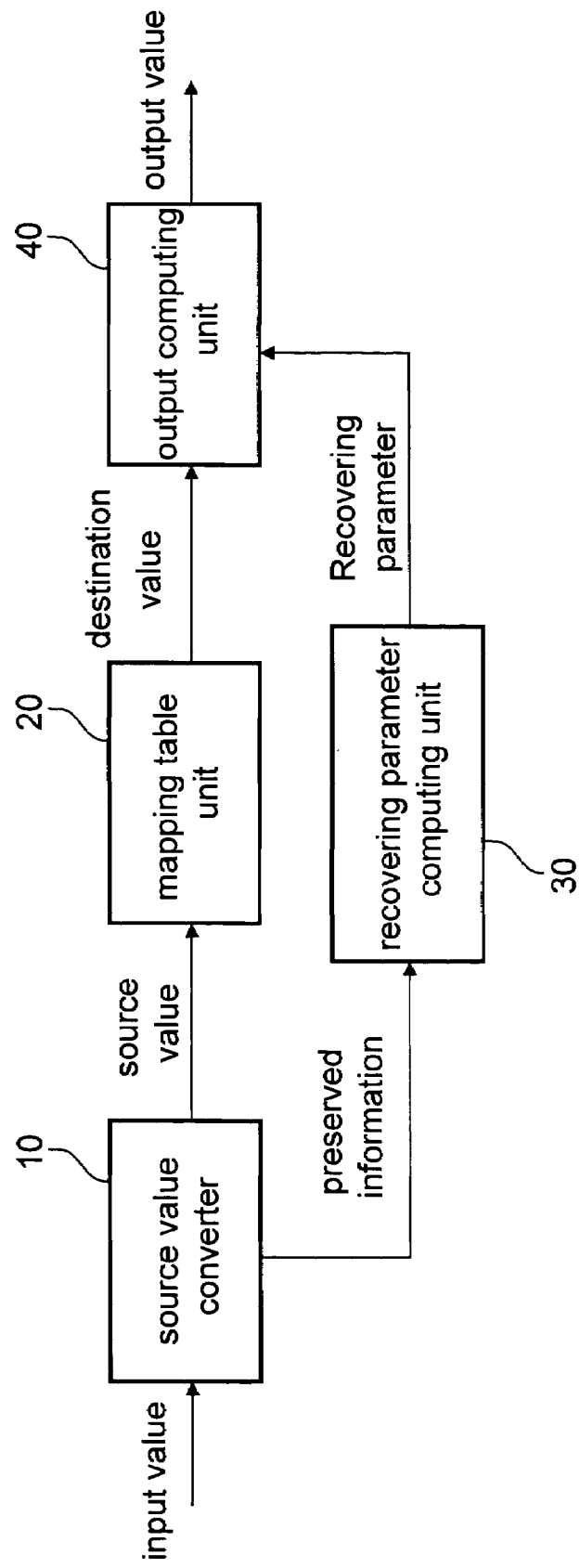
FIG. 2 is a block diagram of the disclosed system.

With reference to FIG. 2, the invention provides a preferred embodiment illustrating how to use the disclosed nonlinear conversion system with precision mapping. Any nonlinear conversion after the conversion can give a "limited-domain increasing/decreasing function." That is, the input value to source value conversion is achieved by mapping a limited destination domain. The source destination mapping relation has an increasing or decreasing trend. For example, the log convert, log add, square root, sine or cosine functions can use the disclosed system and method. Nevertheless, the conversion steps for different conversions may be different. The disclosed system includes a source value converter 10, a mapping table unit 20, a recovering parameter computing unit 30, and an output computing unit 40. The source value converter 10 receives an input value, converts it into a source value and generates a preserved information. The source value is mapped to a destination value in a limited domain so as to restrict the calculation with a destination domain. The mapping table unit 20 is established by directly selecting a precision according to the destination domain and inverse-mapping back to a source domain. The prevision directly determines a quantization step $\Delta$ of the destination domain. The recovering parameter computing unit 30 operates the preserved information that has to be preserved during the source value conversion process to obtain a recovering parameter. The output computing unit 40 combines the destination value output by the mapping table with the recovering parameter to perform a recovering procedure, recovering an output value produced by the nonlinear conversion of the input value.

Figure 3:
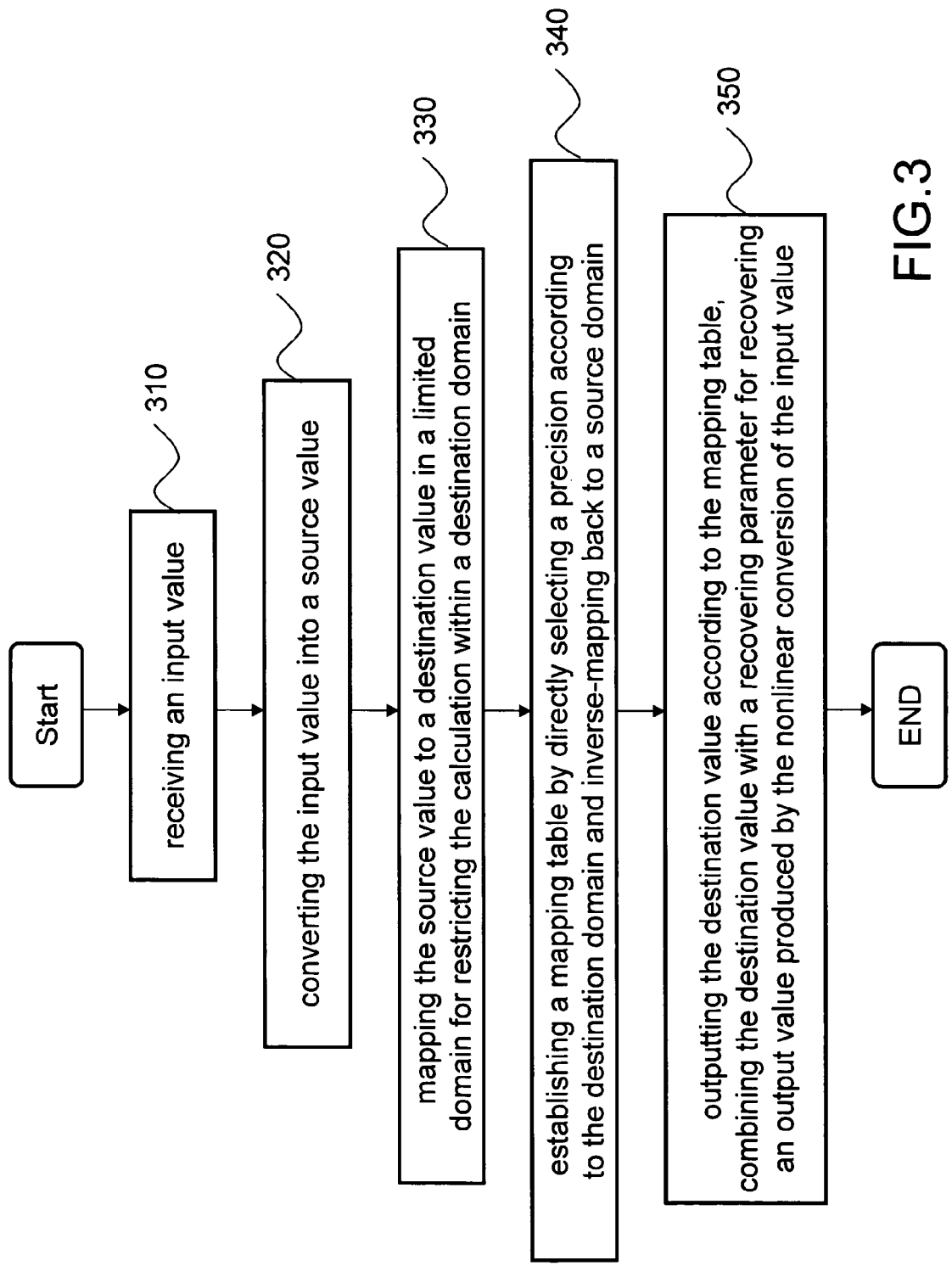
FIG. 3 is a flowchart of the disclosed method.

As shown in FIG. 3, the invention provides another embodiment to explain the disclosed nonlinear conversion method using precision mapping. The method includes the steps of: receiving an input value (step 310); converting the input value into a source value (step 320); mapping the source value to a destination value in a limited domain for restricting the calculation within a destination domain (step 330); establishing a mapping table by directly selecting a precision according to the destination domain and inverse-mapping back to a source domain (step 340); and outputting the destination value according to the mapping table, combining the destination value with a recovering parameter for recovering an output value produced by the nonlinear conversion of the input value (step 350).

Figure 4:
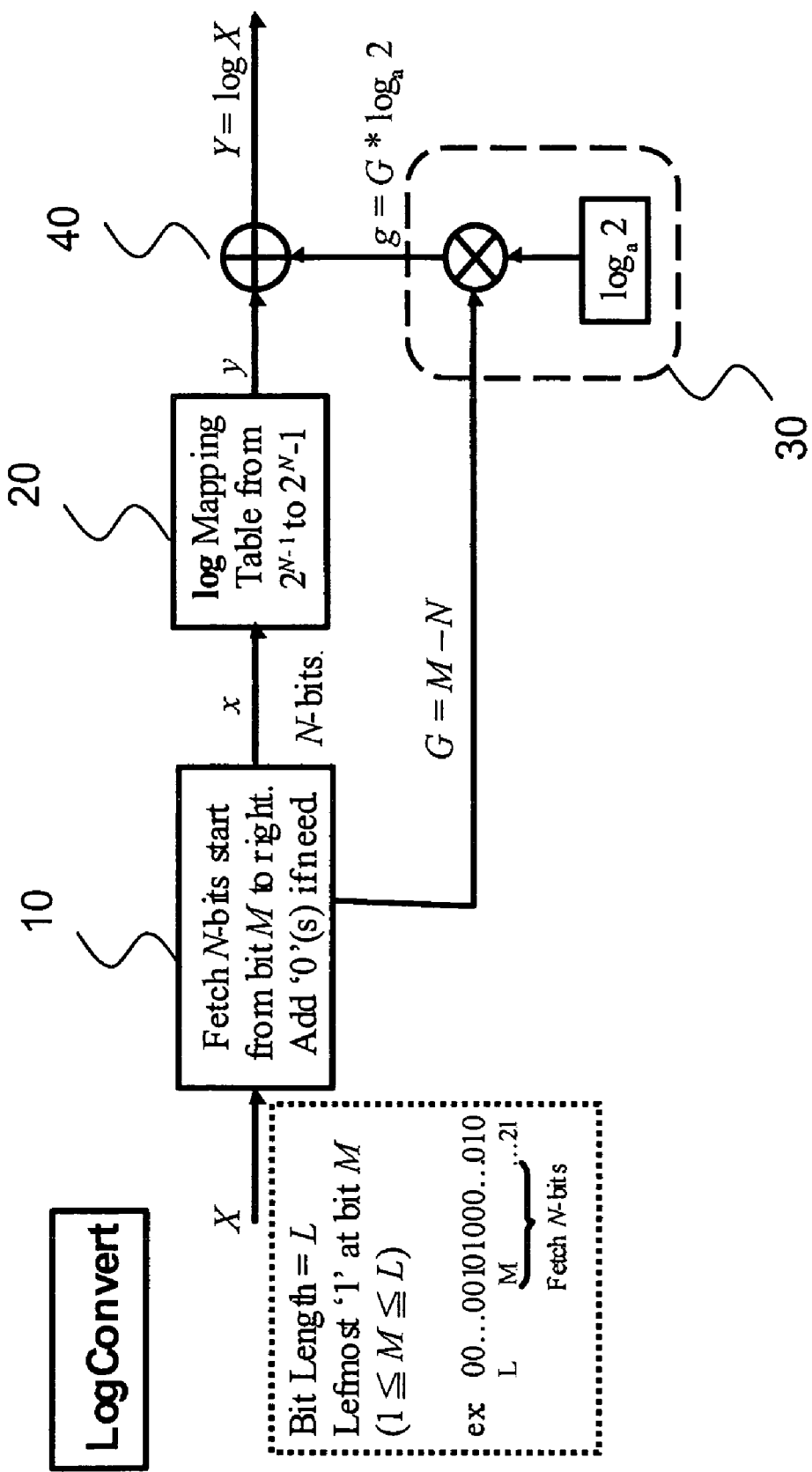
FIG. 4 shows that the disclosed system structure is applicable to the log convert.

FIG. 4 shows that the log convert can use the disclosed system structure. Suppose the input value $X \geq 1$ and one wants to calculate a log conversion of it in the base of a (i.e. $\log_a X$). If the leftmost '1', or MSB $\epsilon 1$, is at the M-th bit counting from the right ($1 \leq M \leq L$), then totally N bits including the M-th bit are retrieved. Extra bits are inserted with 0. Now one has an N-bit source x. When N is sufficiently large, the output value Y of log converted x, supplemented with a recovering parameter, $(M-N) \cdot \log_a 2$, will be close to that obtained by directly performing the log conversion on X ($Y=\log_a X$).

Figure 4A:
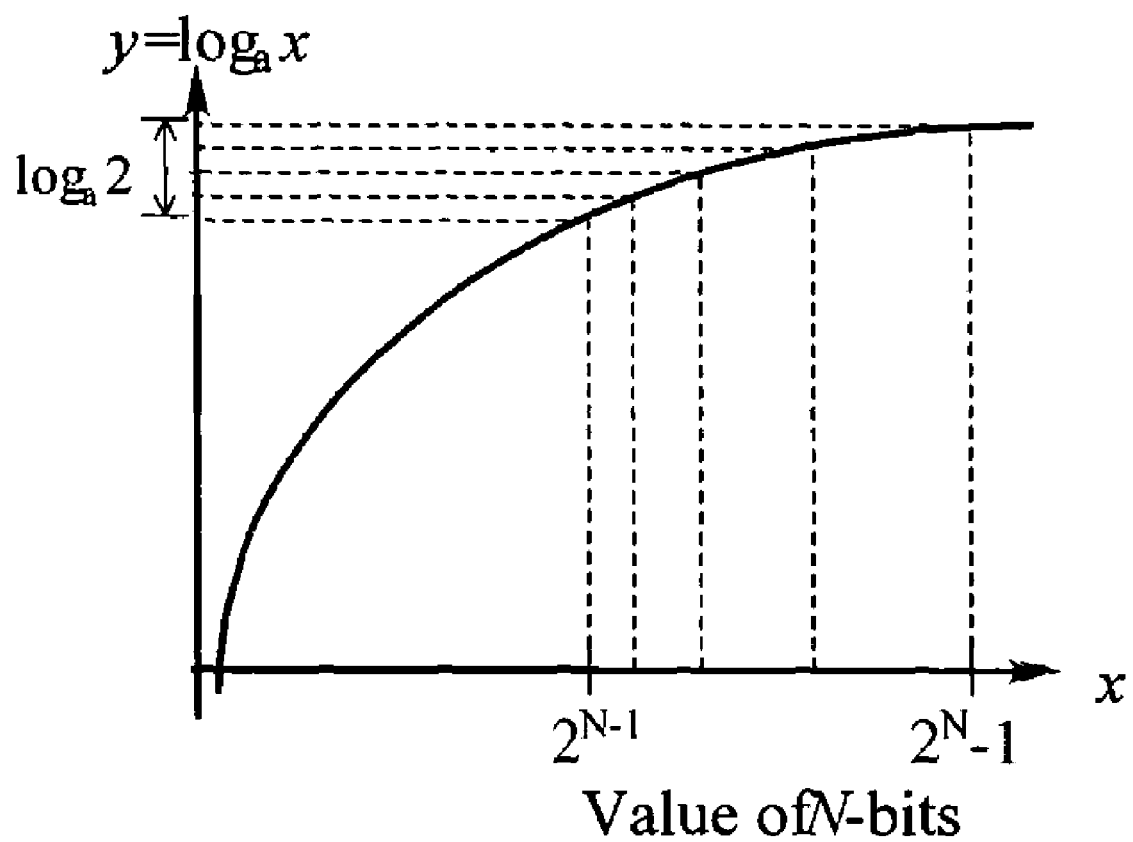
FIG. 4A shows that the convert mapping table according to FIG. 4.

The relation between the N-bit source value x and the log converted destination value y is shown in FIG. 4A. The used source domain only covers $2^{N-1} \sim 2^N - 1$. The variation range of the destination domain is $\log_a 2$. Therefore, one is able to make log convert mapping table of $y=\log_a x$ in this range. Any X can be transformed into x, which is then mapped to y. Afterwards, the difference (M−N) is taken to perform a recovery routine. This then completes the $Y=\log_a X$ operation.

The establishment of the mapping table uses twice the required precision as the quantization step $\Delta$. The destination domain is directly quantized. The quantized destination value is inverse mapped to find the corresponding source value as a source index. In actual mapping, the source value of each index is mapped to the mid-point of the corresponding quantization step. Therefore, the mapping error is only $\Delta/2$, in accord with the required precision.

Figure 5C:
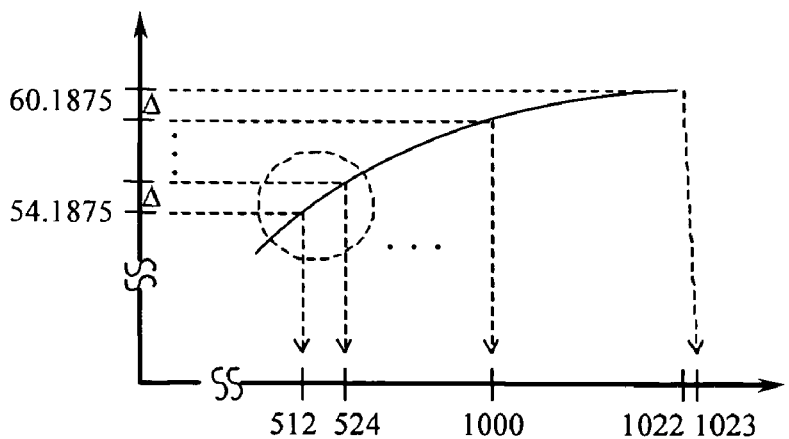

FIGS. 5A to 5G are schematic views showing how to establish the disclosed mapping table unit 20. Take the log convert $Y=20 \log_{10} X$ as an example. As shown in FIG. 5A, the input of the log convert can be of an arbitrary bit length, converted to a source of 10 bits (N=10). The value domain is 512~1023. Therefore, the destination domain is 54.19~60.20, whose range is about 6. If one wants to a precision of 0.1, then twice of that is taken as the quantization step. Five bits are used to express the decimal places with the quantization step Δ=0.1875. The destination values are quantized from 54.1875 to 60.1875 at equal steps, as shown in FIG. 5B.

Figure 5D:
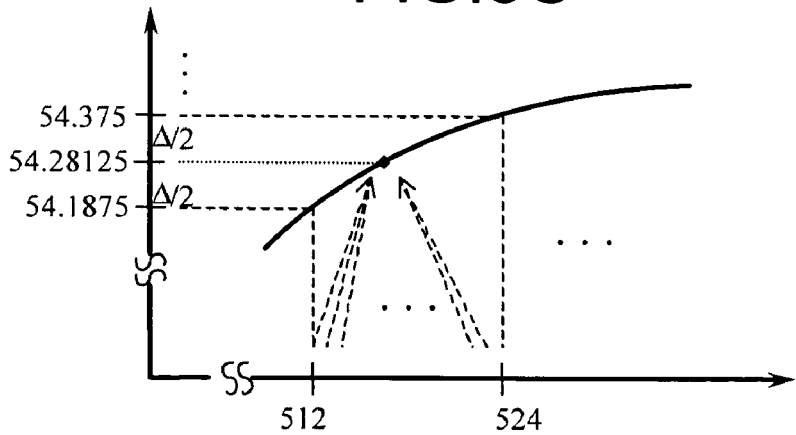
Figure 5E:
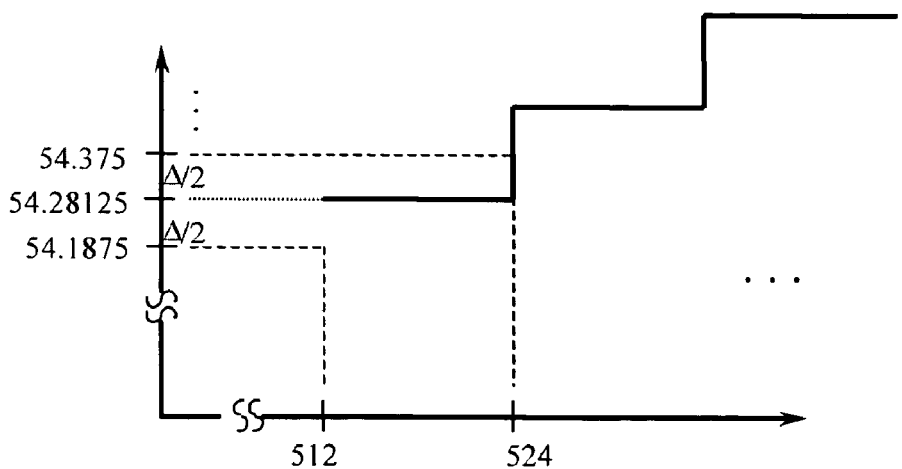
Figure 5F:
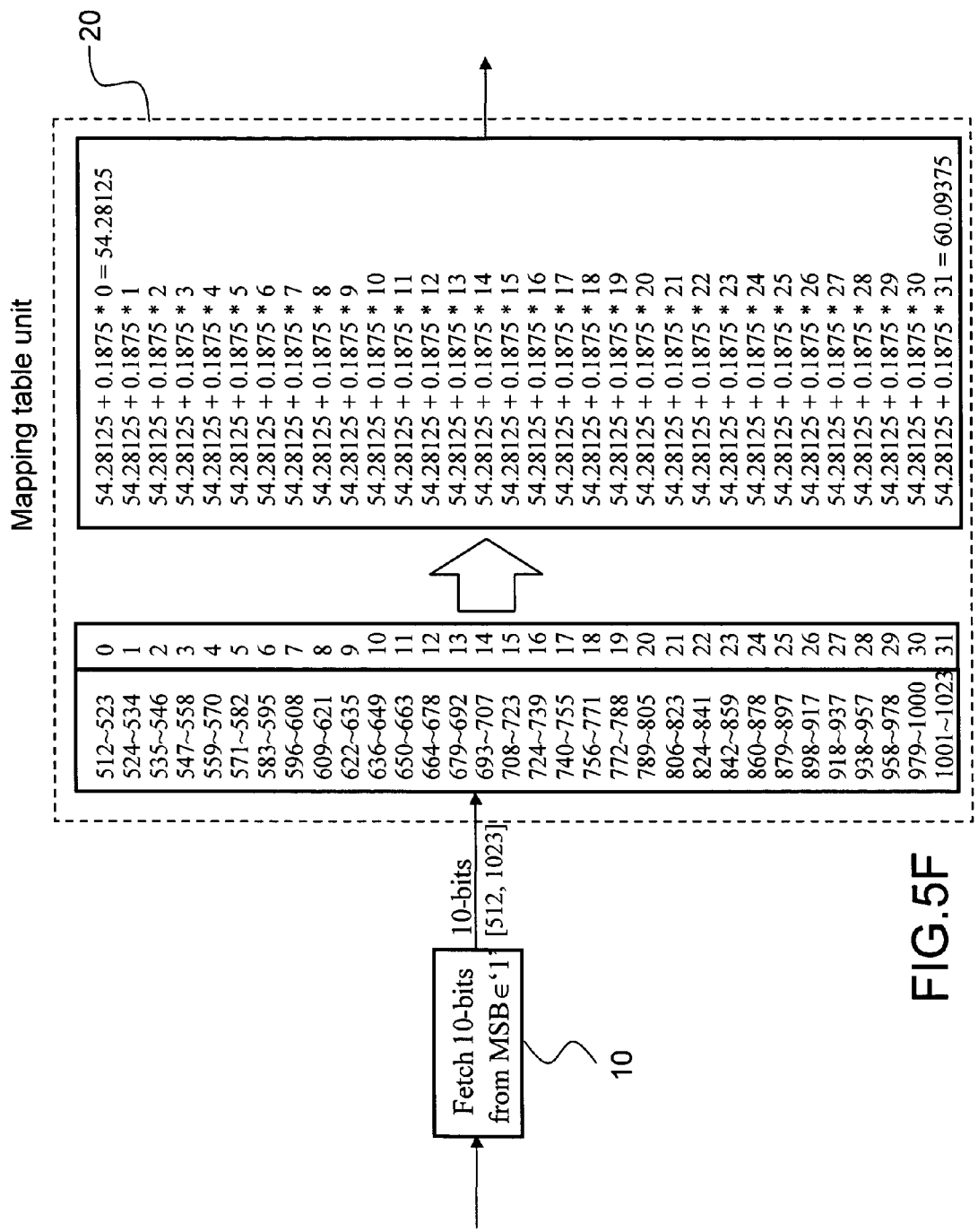

With reference to FIG. 5C, source indices 512, 524, ..., 1023 are obtained by inverse-mapping back to a source domain. It should be emphasized that the boundary destination values are inverse-mapped to boundary source values. For example, 60.1875 is inverse-mapped to 1023. The actual mapping relation is established by mid-point mapping, as shown in FIGS. 5D and 5E. The mapping relation table is illustrated in FIG. 5F. We have (destination value)=(basic offset)+(quantization step Δ)×(column number). The basic offset is computed according to the boundary of the limited range. The memory only needs to record the source indices. This greatly reduces the size of the table.

Figure 5G:
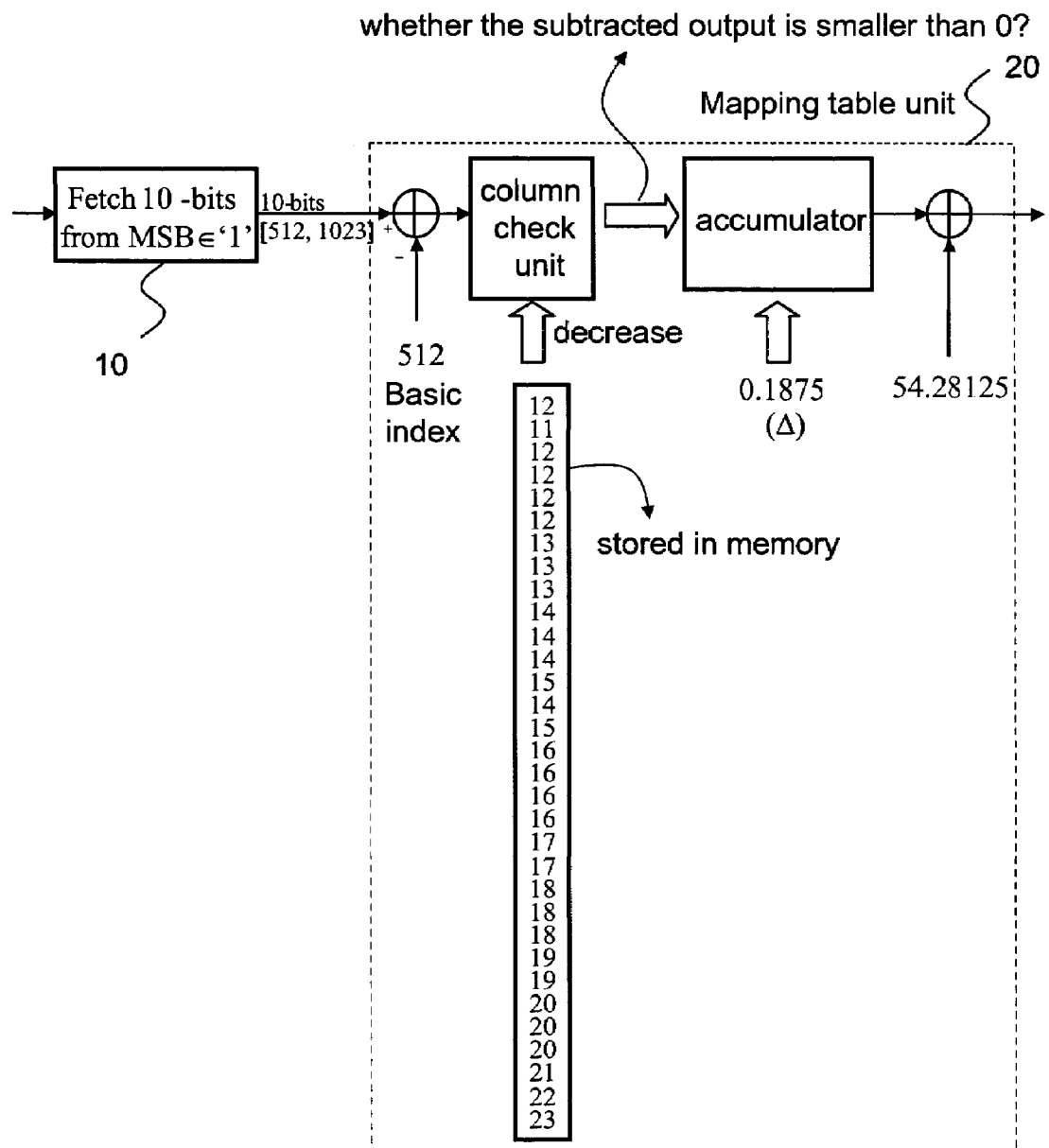

Now please refer to FIG. 5G. The basic index 512 is first subtracted (this can be done by setting the leftmost bit to 0). One may use an accumulative table to further reduce the size of the table. The quantity "(quantization step Δ)×(column number)" can be computed using an accumulator. First, the accumulator is set as zero. Afterwards, the input of a column check unit is subtracted with the source indices stored in memory in sequence. One then checks whether the subtracted output is smaller than 0. If not, then the accumulator is increased by one quantization step Δ, until it is smaller than 0. The source indices are stored in an accumulative way: 524−512=12, 535−524=11, ..., and 1023−1000=23.

Figure 6:
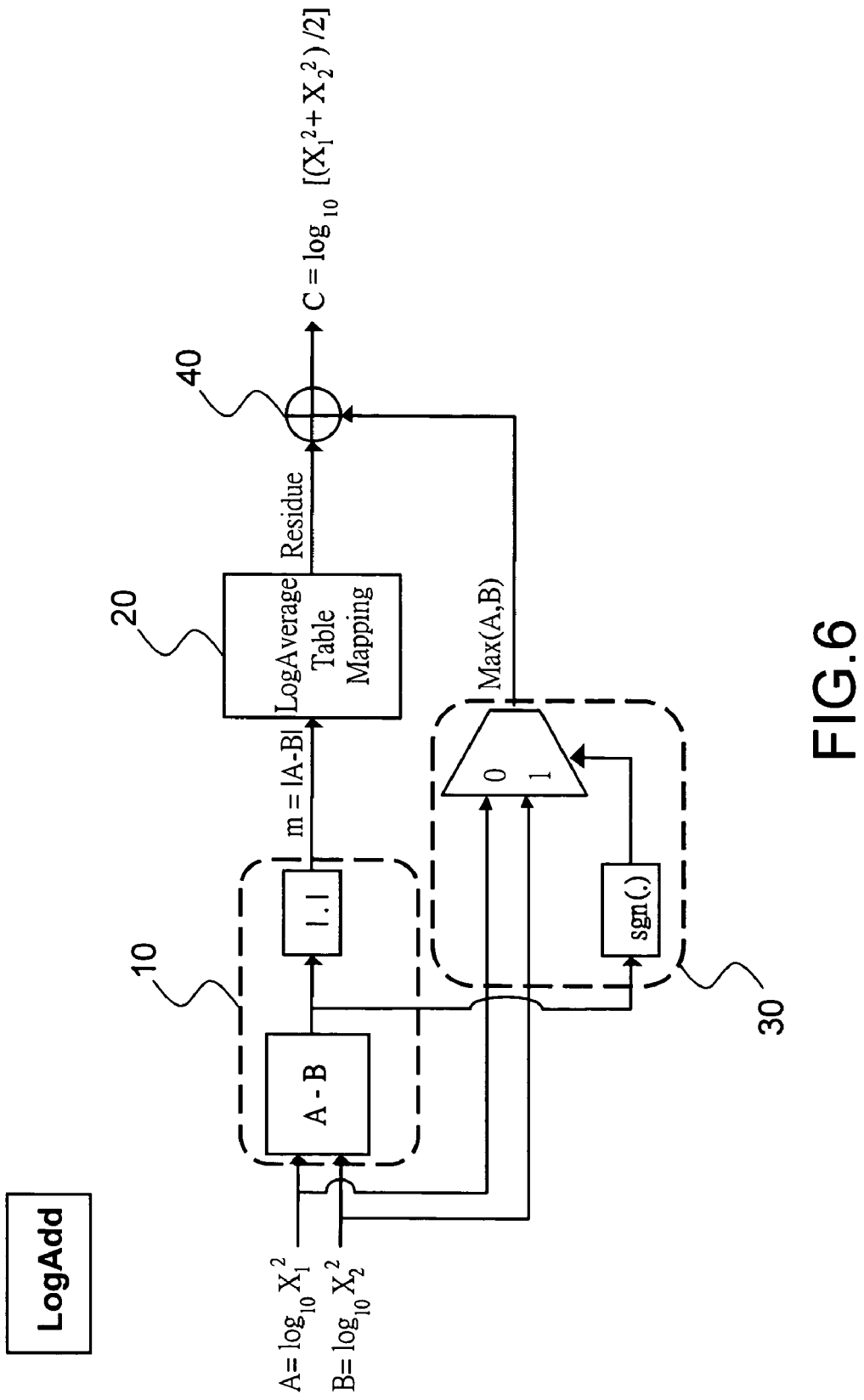
FIG. 6 shows that the disclosed system structure is applicable to the log add.

FIG. 6 explains how the system structure is applicable to the log add. An embodiment of the log ad is to obtain the power average. Suppose there are two power values A=10 $\log_{10} X_1^2$ and B=10 $\log_{10} X_2^2$, with A≧B. If one wants to compute C=10 $\log_{10}[(X_1^2 + X_2^2)/2]$, then the conversion process is as follows:

$$C = 10 \cdot \log_{10}[(X_1^2 + X_2^2)/2]$$
$$= 10 \cdot \log_{10} X_1^2 + 10 \cdot \log_{10}\left(1 + \frac{X_2^2}{X_1^2}\right) - 10 \cdot \log_{10} 2$$
$$= A + 10 \cdot \log_{10}(1 + 10^{-m}) - 10 \cdot \log_{10} 2, \text{ where } m = A - B$$

Figure 6A:
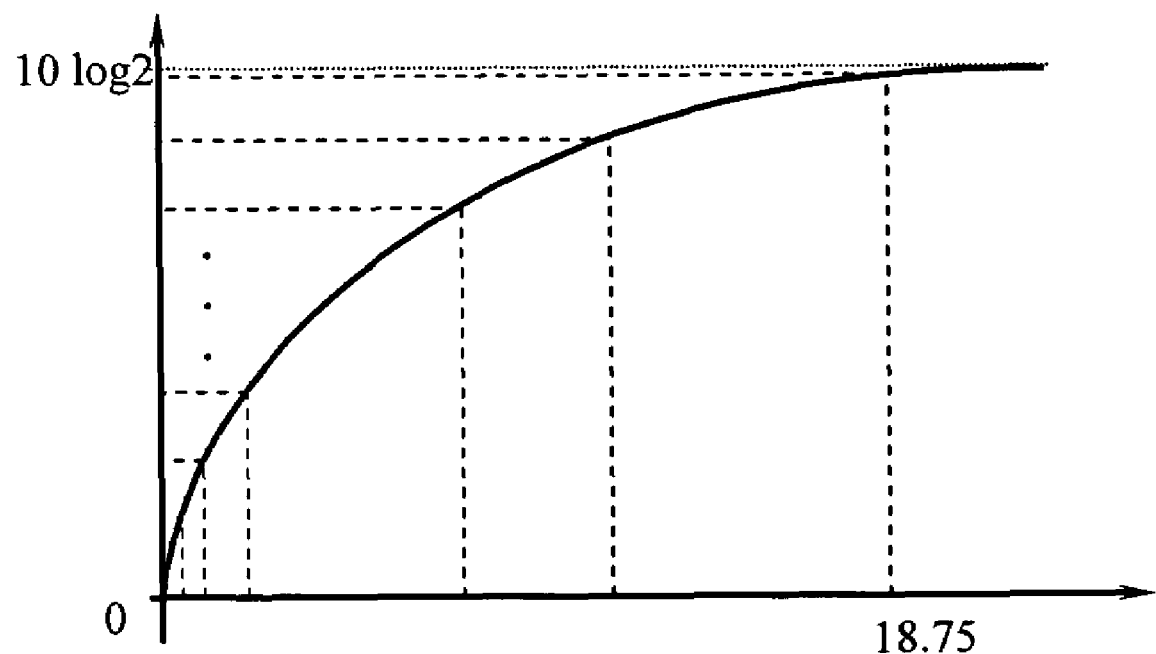

As shown in FIG. 6A, the difference m between the two input values is taken as the source value, $10 \cdot \log_{10}(1+10^{-m})-10 \cdot \log_{10} 2$ is the destination value. The destination domain of the mapping relation is 0~10·$\log_{10} 2$. In accord with the finite destination domain, if the precision has to reach 0.05 then the mapping table unit can be realized according to the procedure shown in FIGS. 5A to 5G. Using five bits to represent the decimal places, the mapping relation using the design of fixed points is illustrated in FIG. 6B.

Likewise, the disclosed system structure is applicable to the square-root operation. The conversion steps are the same as the log convert. The conversion operation is $$(X)^{1/2} = y \times 2^{\frac{M-N}{2}} \quad \text{if } (M-N) \text{ even}$$
$$= y \times 2^{\frac{M-N-1}{2}} \times 1.4142 \quad \text{if } (M-N) \text{ odd}$$

Figure 7:
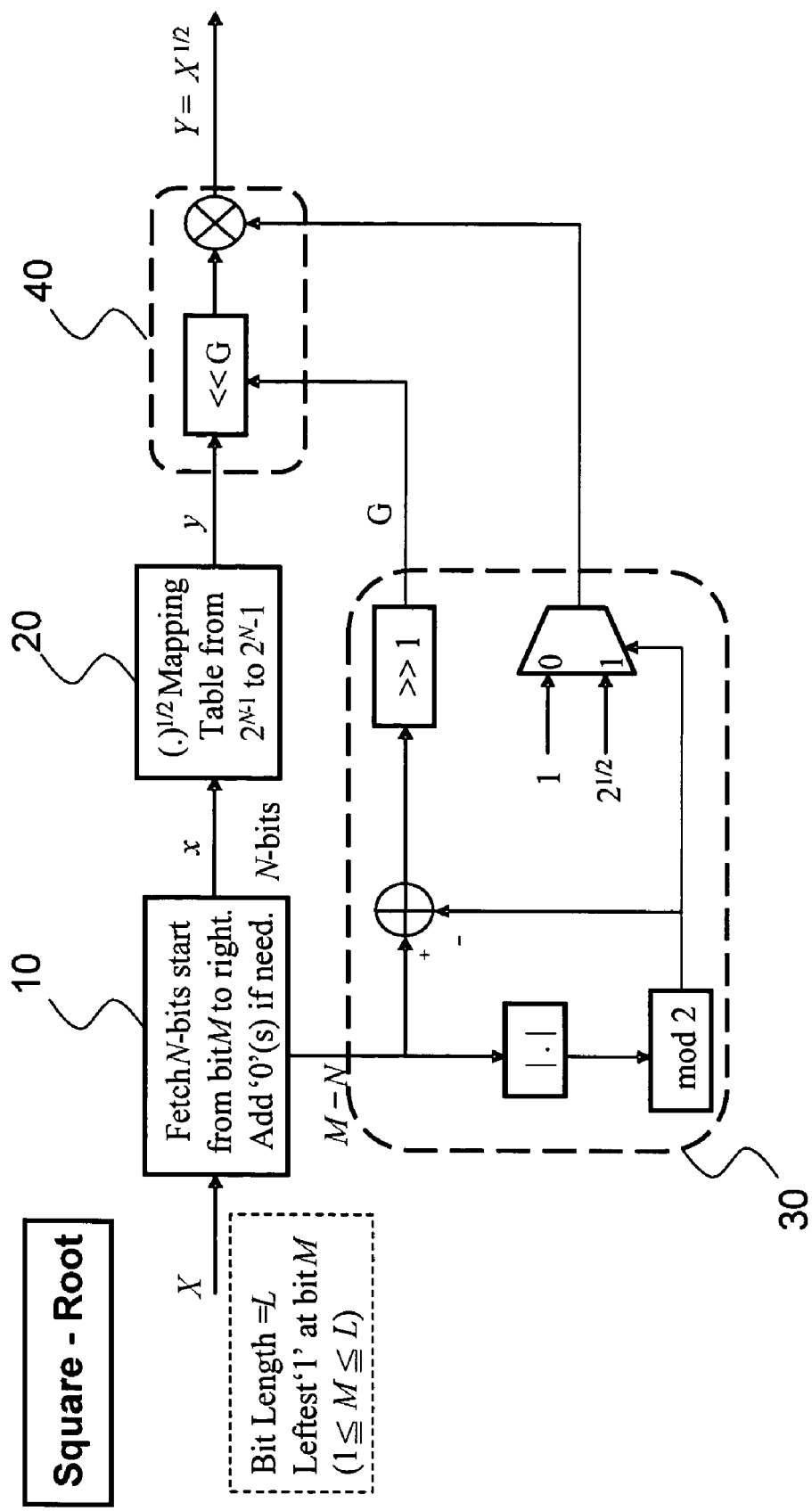
FIG. 7 shows that the disclosed system structure is applicable to the square root operation.

FIG. 7 shows that the disclosed system structure is applicable to the square-root operation. One can complete the square-root operation following the above-mentioned steps and we do not repeat them here again.

Figure 8:
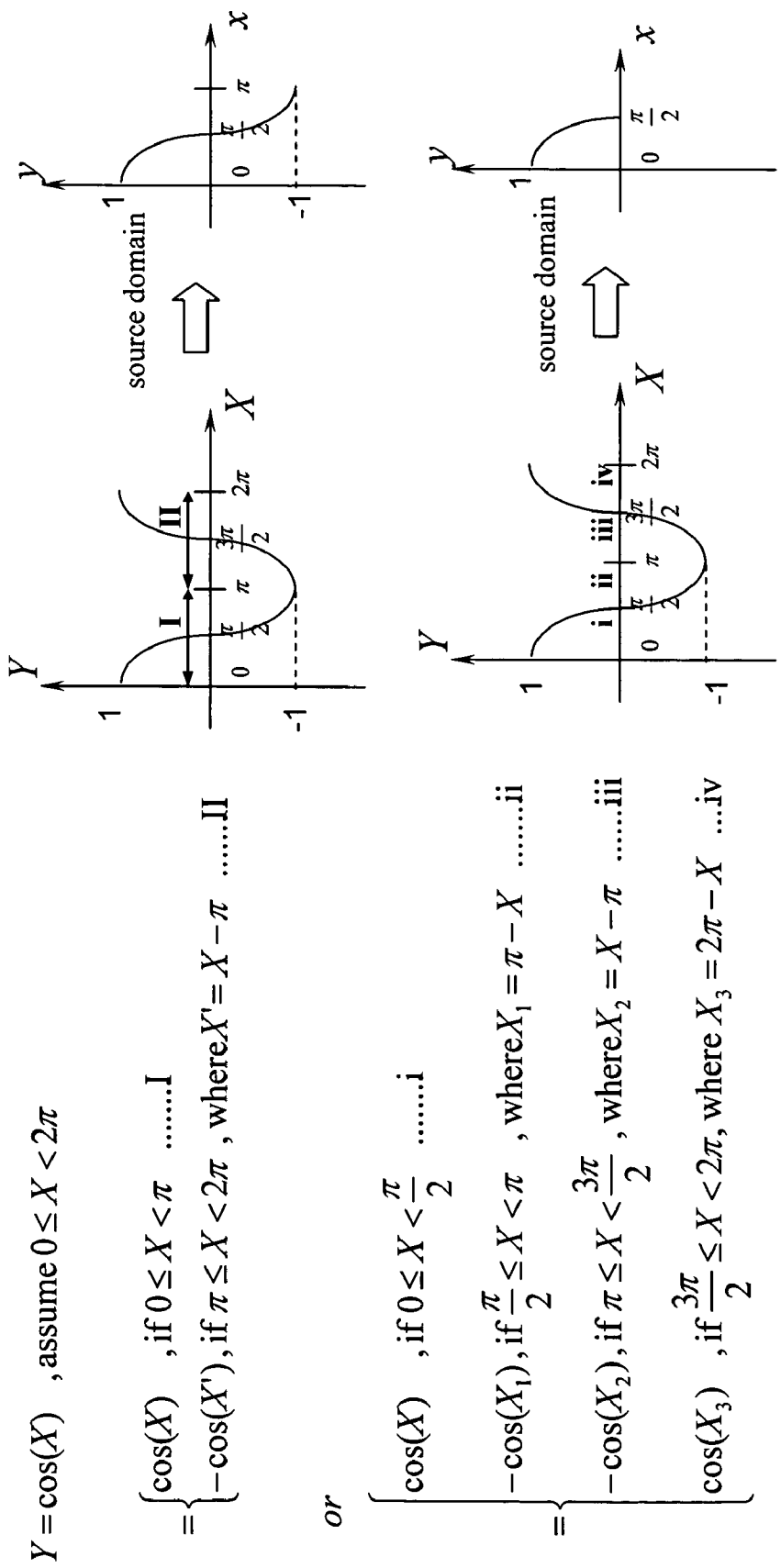
FIG. 8 is a schematic view of domain conversion for the cosine function $Y=\cos(X)$.

The invention further provides an embodiment to explain that the disclosed system structure is applicable to trigonometric functions (sine or cosine). Take the cosine function Y=cos(X) as an example. The domain conversion is shown in FIG. 8. Suppose the input value satisfies 0≦X<2π. There are two solutions to converting an input value to a source value. The operations are as follows:

$$Y = \cos(X), \text{ assume } 0 \le X < 2\pi$$

$$= \begin{cases} \cos(X), & \text{if } 0 \le X < \pi & \text{I} \\ -\cos(X'), & \text{if } \pi \le X < 2\pi, \text{ where } X' = X - \pi & \text{II} \end{cases}$$

or $$= \begin{cases} \cos(X), & \text{if } 0 \le X < \frac{\pi}{2}, & \text{i} \\ -\cos(X_1), & \text{if } \frac{\pi}{2} \le X < \pi, \text{ where } X_1 = \pi - X & \text{ii} \\ -\cos(X_2), & \text{if } \pi \le X < \frac{3\pi}{2}, \text{ where } X_2 = X - \pi & \text{iii} \\ \cos(X_3), & \text{if } \frac{3\pi}{2} \le X < 2\pi, \text{ where } X_3 = 2\pi - X & \text{iv} \end{cases}$$

Figure 8A:
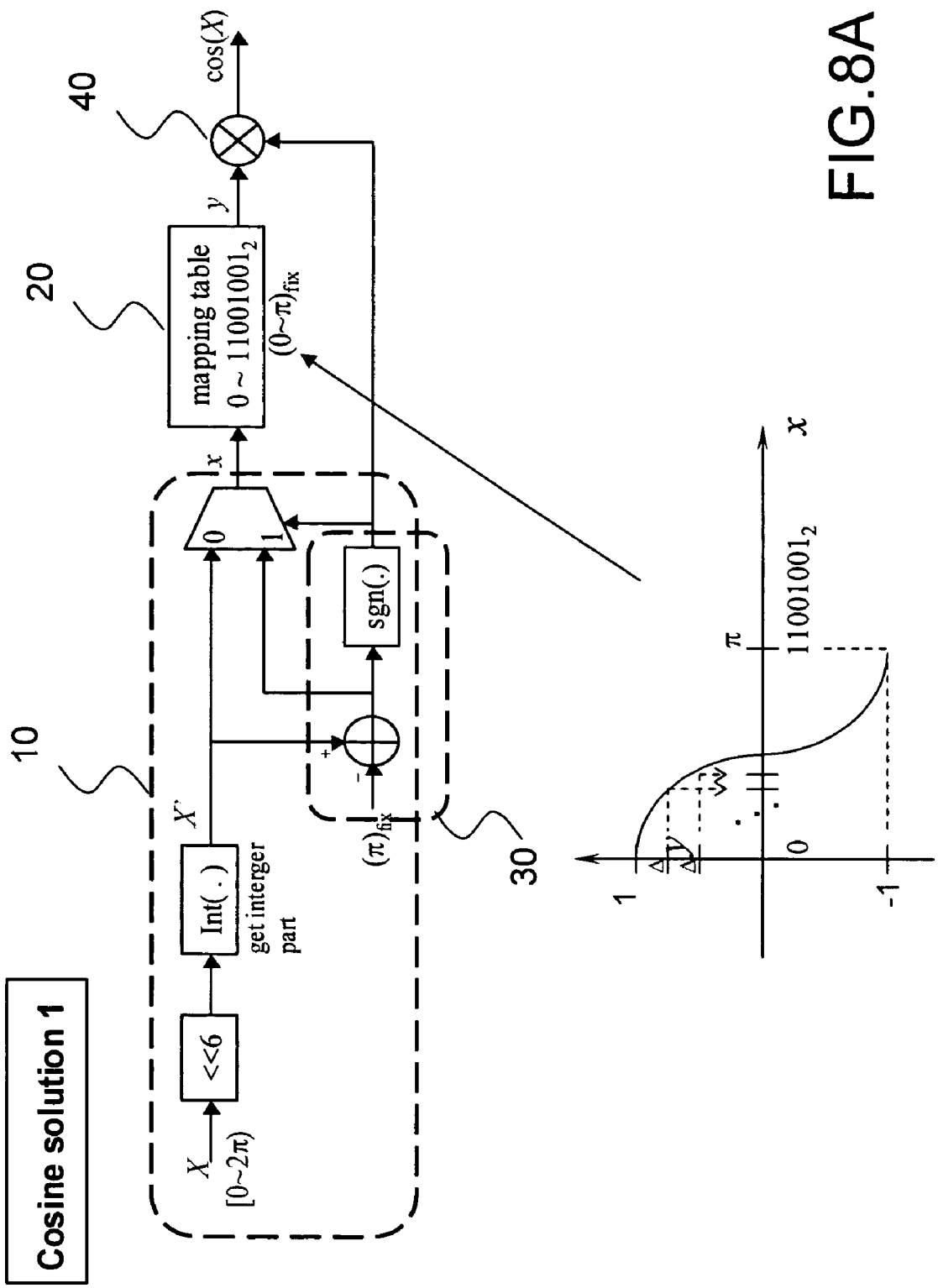
FIGS. 8A and 8B show that the disclosed system structure is applicable to the cosine function.

The first solution is illustrated in FIG. 8A and involves a simpler conversion circuit:

Since π=3.1412159...=11.001001000011...$_2$, we use π<<N to depict fixed points. For example, N=6'$\pi_{fix}$=11001001$_2$. The destination domain of the mapping table unit 20 is −1~1. The establishment of the table may follow the procedure given in FIGS. 5A to 5G. In the respect of the output computing unit 40, the output value is corrected if π≦X<2π.

Figure 8B:
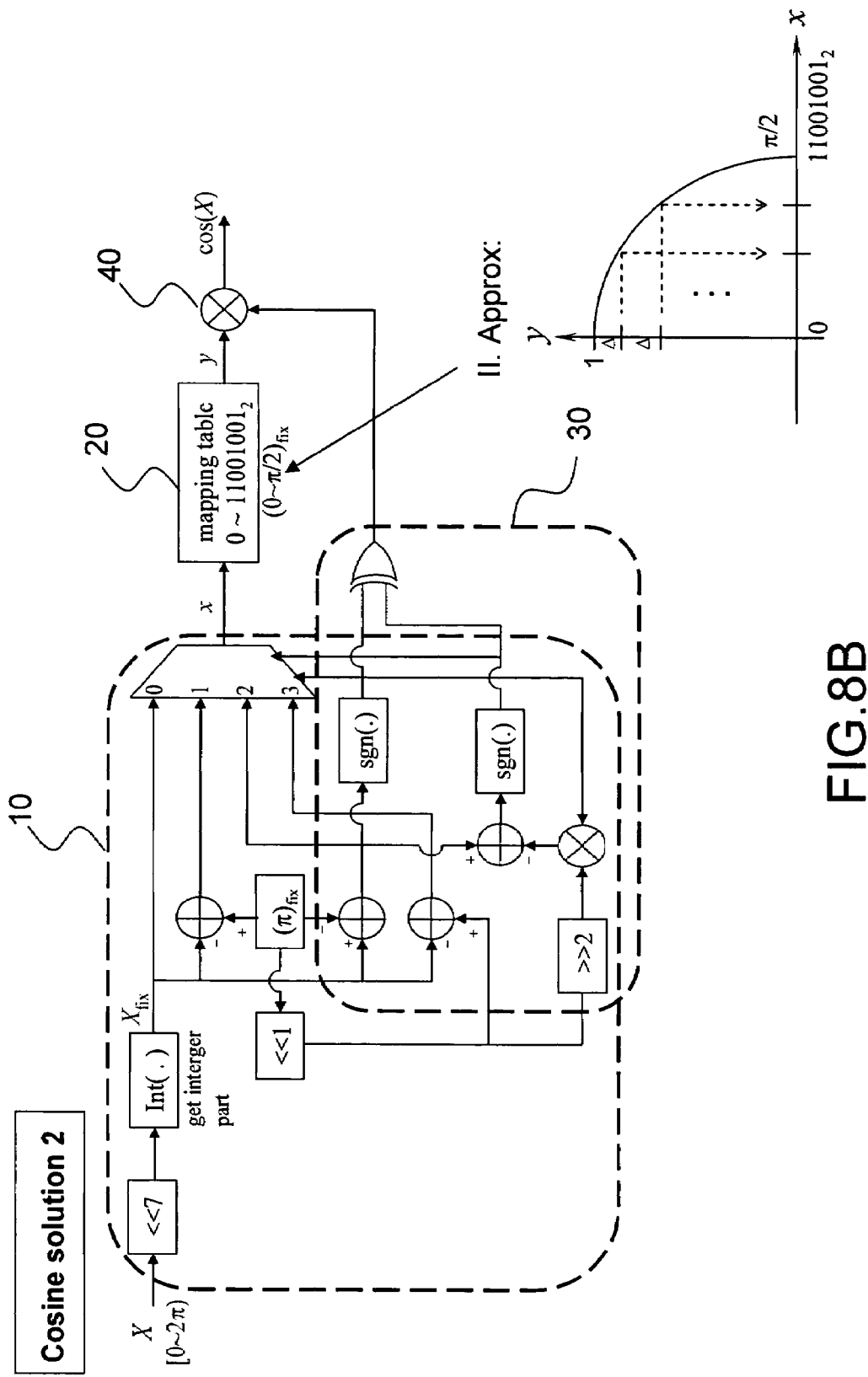

The other solution is illustrated in FIG. 8B and has a higher precision:

Use N=7'$\pi_{fix}$=110010010$_2$' (π/2)$_{fix}$=11001001$_2$. The destination domain of the mapping table unit 20 is 0~1. The establishment of the table may follow the procedure given in FIGS. 5A to 5G. In the respect of the output computing unit 40, the output value is appropriately corrected according to the recovering parameter.

Likewise, the disclosed system structure is also applicable to the sine function operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nonlinear conversion method using precision mapping, comprising:
   receiving an input value;
   converting the input value into a source value and generating a preserved information by a source value converter;
   mapping the source value to a destination value in a limited domain for restricting the calculation within a destination domain by mapping table unit;
   obtaining recovering parameter according to the preserved information by a recovering parameter unit; and
   outputting the destination value according to the mapping table, combining the destination value with a recovering parameter for recovering an output value produced by the nonlinear conversion of the input value by an output computing unit.

2. The nonlinear conversion method using precision mapping according to claim 1, wherein the nonlinear conversion is selected from the group consisting of log, log add, square root, sine function, cosine function, and an increasing/decreasing function that has a limited domain after the conversion.

3. The nonlinear conversion method using precision mapping according to claim 2, wherein in the step of converting the input value into a source value the log conversion and the square root takes N bits starting from the first bit of 1 to perform the conversion, N being an arbitrary real number.

4. The nonlinear conversion method using precision mapping according to claim 1, wherein in the step of selecting a precision according to the destination domain further includes the step of determining a quantization step $\Delta$ of the destination domain.

5. The nonlinear conversion method using precision mapping according to claim 1, wherein the precision of the mapping table is increased using a mid-point mapping method.

6. The nonlinear conversion method using precision mapping according to claim 1, wherein the mapping table includes the use of a basic offset and a basic index according to the boundary of the value domain.

7. The nonlinear conversion method using precision mapping according to claim 1, wherein the mapping table employs an accumulative source index method to reduce the size of the mapping table.

8. A nonlinear conversion system using precision mapping, comprising:
   a source value converter, which receives an input value, converts it to a source value, maps the source value to a destination value in a limited domain, restricting the calculation within the destination domain, and generates a preserved information;
   a mapping table unit, which directly selects a precision for the destination domain and is established by inverse mapping to a source domain;
   a recovering parameter computing unit, which obtains a recovering parameter via the preserved information; and
   an output computing unit, which combines the recovering parameter according to the destination value output by the mapping table to recover an output value produced by the nonlinear conversion of the input value.

9. The nonlinear conversion system using precision mapping of claim 8, wherein the nonlinear conversion is selected from the group consisting of log, log add, square root, sine function, cosine function, and an increasing/decreasing function that has a limited domain after the conversion.

10. The nonlinear conversion system using precision mapping of claim 8, log conversion and the square root takes N bits starting from the first bit of 1 to perform the conversion, N being an arbitrary real number.

11. The nonlinear conversion method using precision mapping of claim 8, wherein the precision of the mapping table is increased using a mid-point mapping method.

12. The nonlinear conversion method using precision mapping of claim 8, wherein the mapping table includes the use of a basic offset and a basic index according to the boundary of the value domain.

13. The nonlinear conversion system using precision mapping of claim 8, wherein the mapping table employs an accumulative source index method to reduce the size of the mapping table.

14. The nonlinear conversion system using precision mapping of claim 8, wherein the mapping table further includes memory to store a source index.

15. The nonlinear conversion system using precision mapping of claim 8, wherein the mapping table further includes an accumulator.

* * * * *